Figure 1:
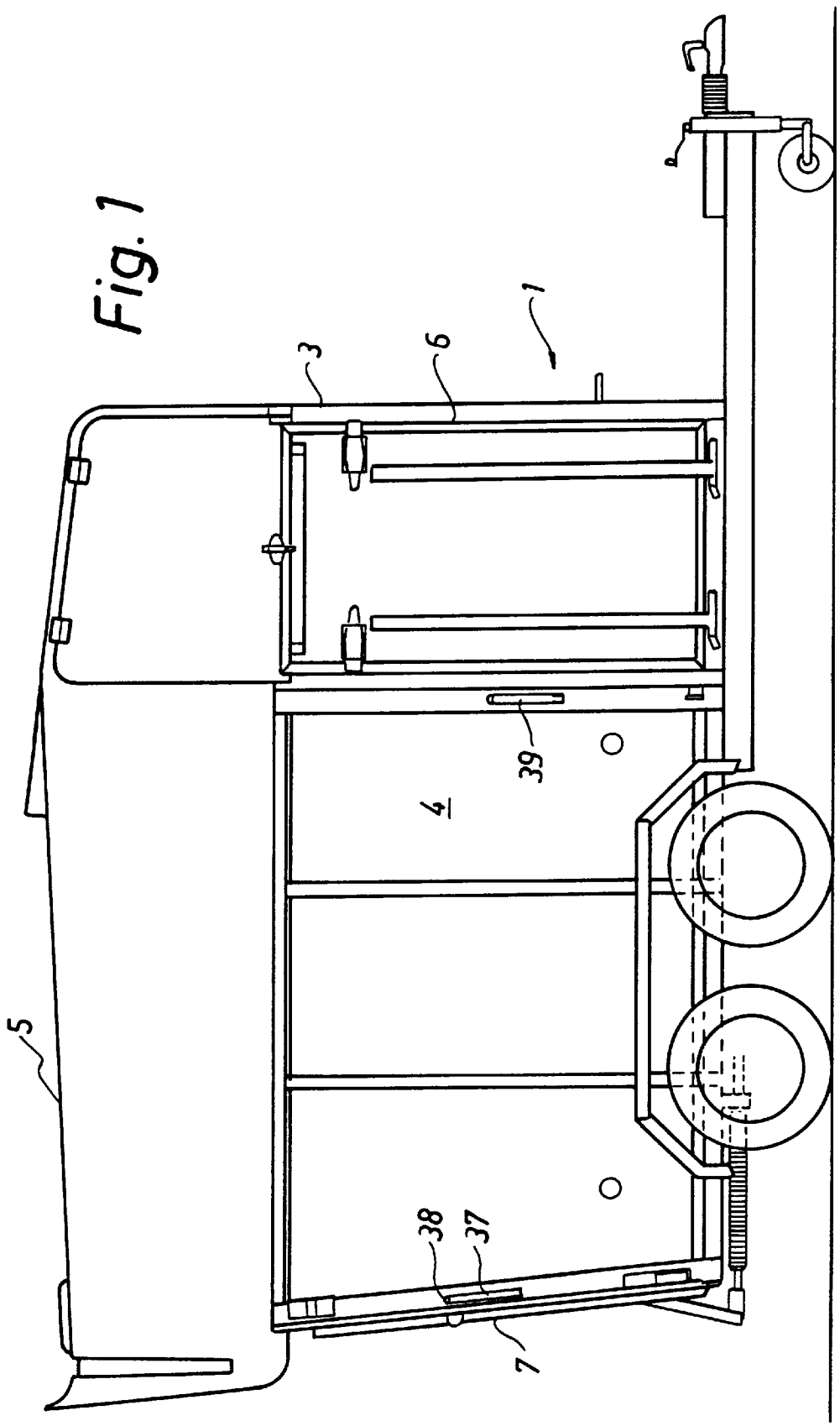

United States Patent [19]
Stenholm

[11] Patent Number: 5,988,721
[45] Date of Patent: Nov. 23, 1999

[54] VEHICLE FOR TRANSPORTING HORSES

[75] Inventor: Tom Stenholm, Asarum, Sweden

[73] Assignee: Tomon Arabians AB, Asarum, Sweden

[21] Appl. No.: 08/894,079

[22] PCT Filed: Feb. 12, 1996

[86] PCT No.: PCT/SE96/00168

§ 371 Date: Aug. 13, 1997

§ 102(e) Date: Aug. 13, 1997

[87] PCT Pub. No.: WO96/25303

PCT Pub. Date: Aug. 22, 1996

[30] Foreign Application Priority Data

Feb. 13, 1995 [SE] Sweden .................................. 9500488

[51] Int. Cl.$^6$ ........................................................ B60P 3/04
[52] U.S. Cl. ......................................... 296/24.2; 410/144
[58] Field of Search ............................. 296/24.2; 410/144

[56] References Cited

U.S. PATENT DOCUMENTS 4,355,594 10/1982 Wagner .
4,553,888 11/1985 Crissy et al. ............................. 410/144
4,702,653 10/1987 Gaudling et al. ....................... 410/144
5,513,595 5/1996 Chatterton ............................. 296/24.2

FOREIGN PATENT DOCUMENTS 502166 8/1995 Sweden .

*Primary Examiner*—Gary C. Hoge
*Attorney, Agent, or Firm*—Burns, Doane, Swecker & Mathis, L.L.P.

[57] ABSTRACT

A vehicle for transporting horses comprises at least one compartment, which is intended for a horse to be transported standing in the direction of travel of the vehicle. The compartment has a releasable transverse bar (9) at least in the front part as seen in the direction of travel. One end of the bar, which extends up to an outer vehicle wall (4), is provided with a lug (10). In said vehicle wall there is at least one recess, into which the lug (10) of the bar is insertable and lockable by means of a vertically displaceable piston means. This comprises at least one locking bar, which is vertically insertable into the lug, and is, via link means, connected to a lever (37) which is arranged on the outside of said vehicle wall (4) and by means of which the piston means is vertically displaced.

8 Claims, 8 Drawing Sheets

VEHICLE FOR TRANSPORTING HORSES

The present invention relates to a vehicle for transporting horses according to the preamble to claim 1.

When transporting horses, the horse is made to stand preferably in the direction of travel in a relatively narrow compartment, whose side walls laterally support the horse in a satisfactory manner while being transported. In the front part as seen in the direction of travel, the compartment is suitably limited by a thick horizontal bar, which, transversely of the direction of travel, is arranged on the same level as the shoulder of the horse to support the horse when braking the vehicle. Also in the rear part, the compartment is in many cases limited by a corresponding bar, which is mainly intended to confine the horse in the compartment during loading and unloading when the doors of the vehicle are open.

During loading and unloading and during transport, many horses are very nervous and, thus, unreliable. The risk of injuries when handling such horses is obvious and can only be reduced by certain elements of risk being, if possible, completely eliminated or at least restricted, The greatest risk of injury when handling horses in connection with vehicle transportation arises when, for some reason, a horse has managed to put his front legs on the wrong side of the bar arranged in the front part of the compartment. The horse is then helplessly stuck on the bar and is in many cases seized with panic. The only way of getting the horse unhurt from this precarious situation is to release the bar, but traditionally this is possible only from the interior of the vehicle. This makes it necessary to go to the horse in the vehicle in order to reach the suspension means of the bar.

Traditional suspension means are formed almost like hinges, in which a plurality of hinge sleeves having vertical openings are arranged one above the other on the inside of the side walls of the compartment, each the bar has a sleeve corresponding to the space between two such hinge sleeves, and a loose pin is insertable into the hinge sleeves and the sleeve at the and of the bar to lock this. To release the end of the bar, merely the pin thus has to be pulled out, but, as mentioned above, this can be carried out only from the inside of the vehicle.

A further risk of injury, which is associated with the traditional bar suspension means, is that the hinge sleeves project from the side walls of the compartment and, thus, significantly increase the risk of injury caused by squeezing or tearing. Moreover, horse cloths or the like often get caught on the projecting hinge sleeves and can then be torn.

In view of the above described drawbacks of the traditional bar suspension means, the object of the present invention is to provide a vehicle for transporting horses, in which the above-mentioned risks are eliminated or at least reduced to a considerable extent.

This object is achieved by a vehicle for transporting horses, which is of the type mentioned by way of introduction and which has the features recited in the characterising clause of claim 1.

Preferred embodiments of the vehicle for transporting horses according to the invention are defined in the subclaims.

Figure 2:
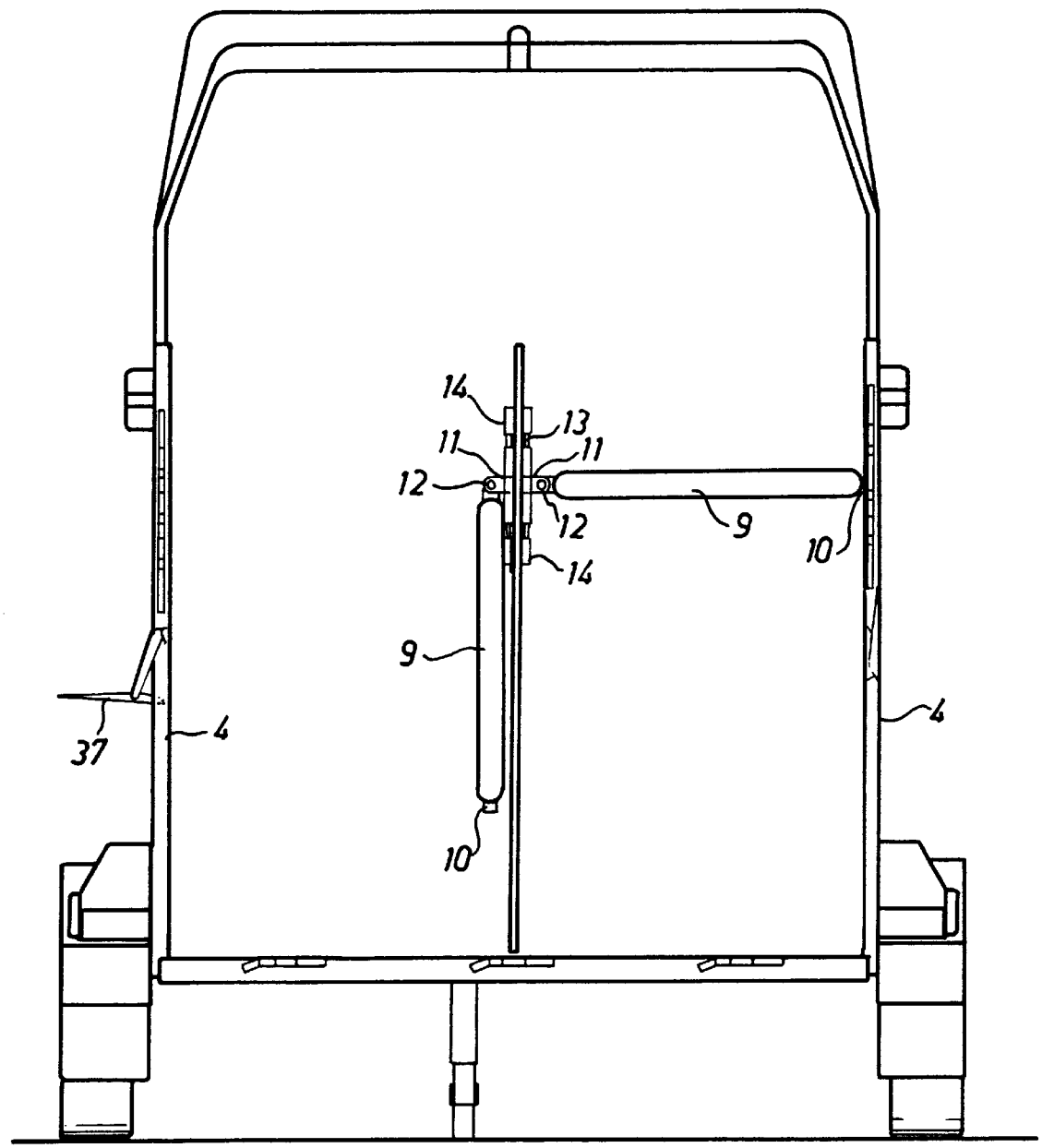
Figure 3:
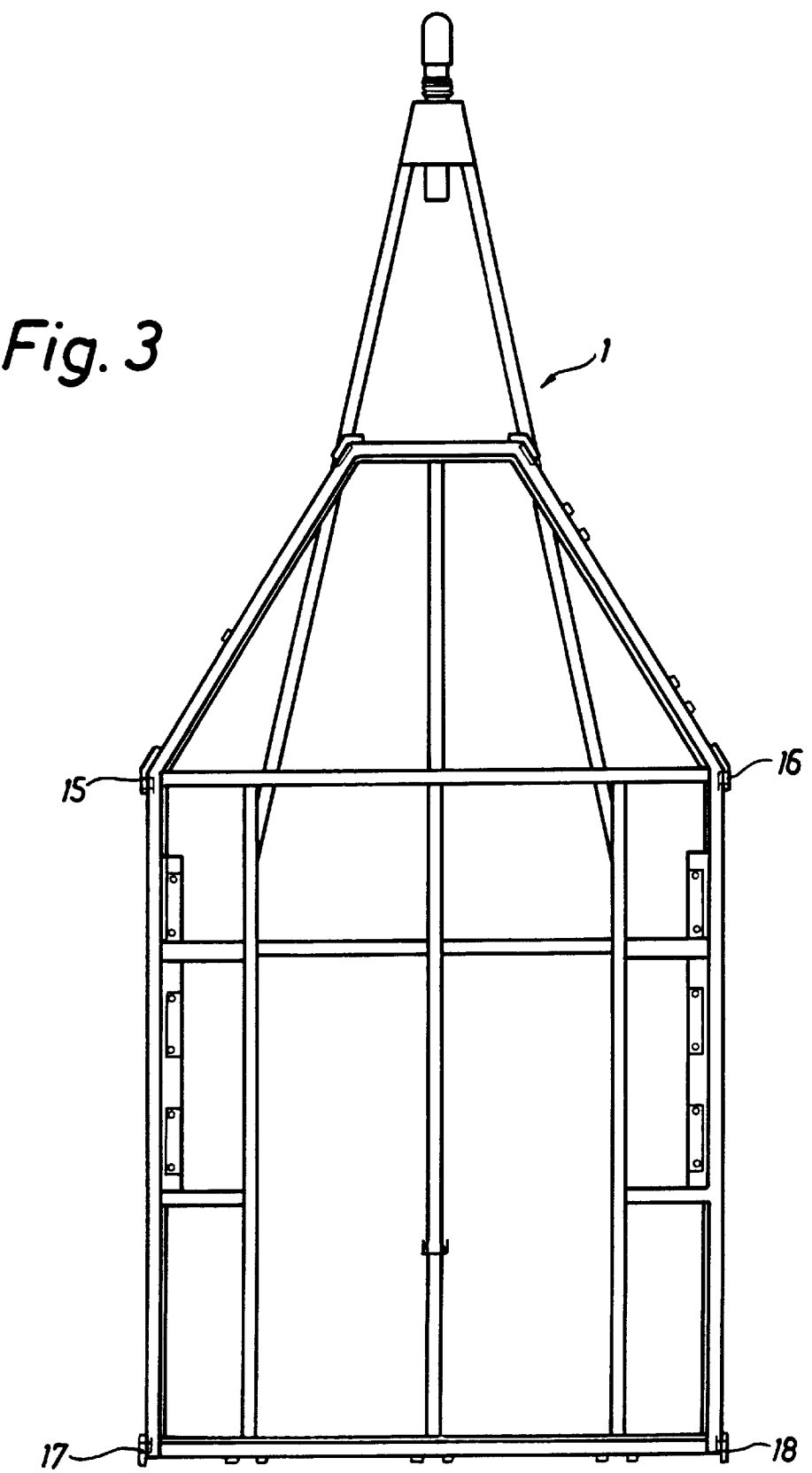
Figure 4:
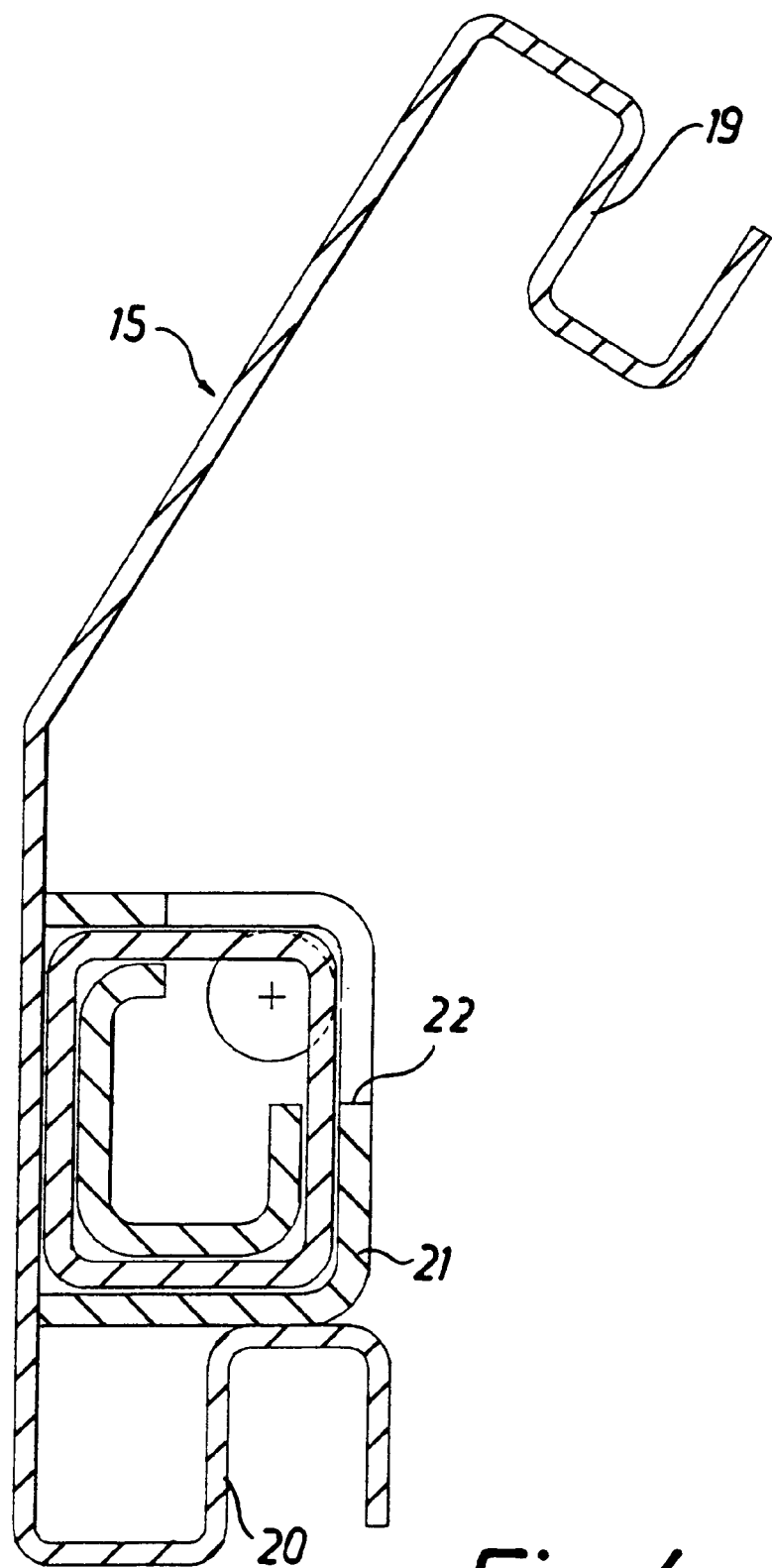
Figure 5:
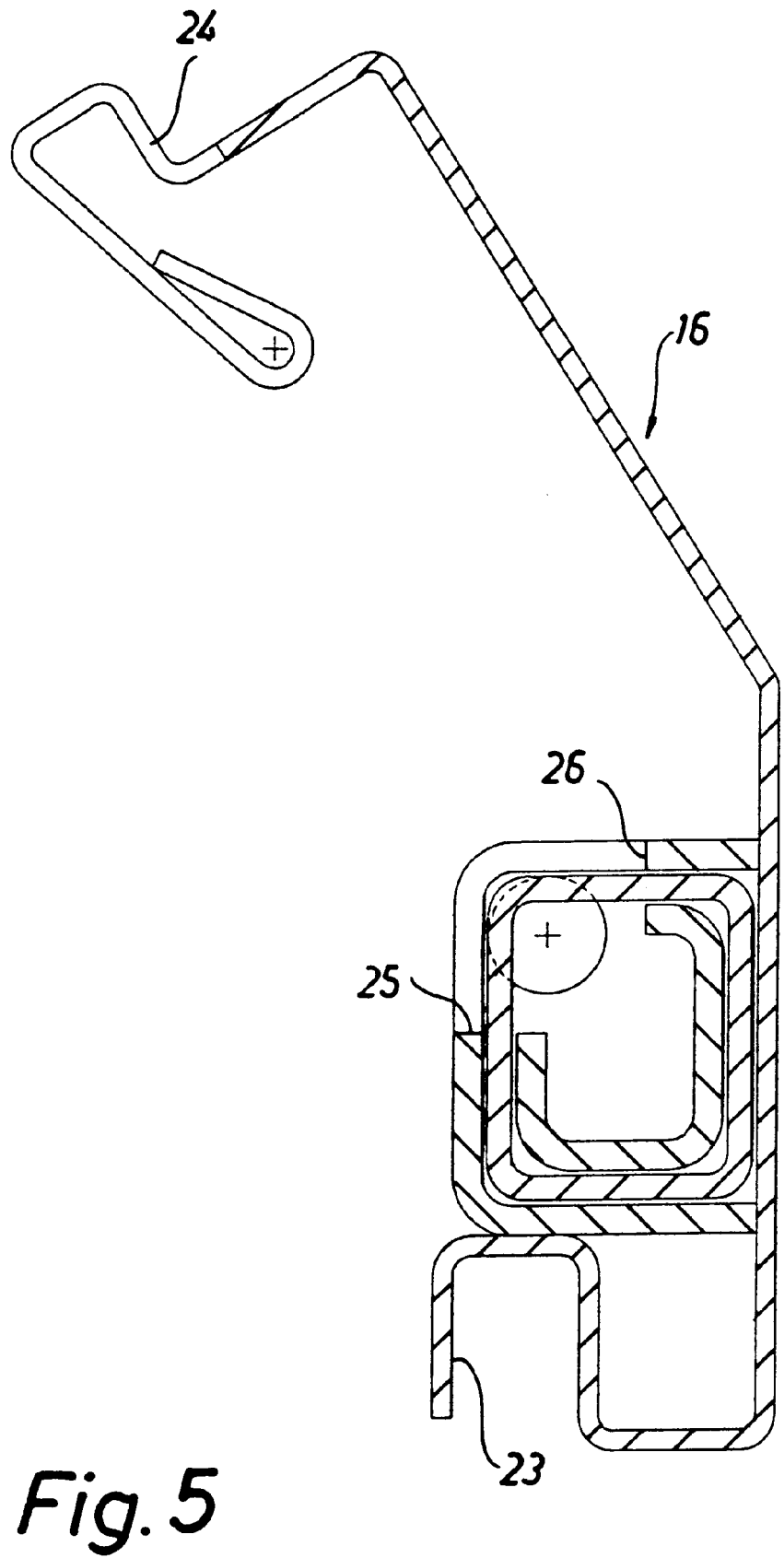
Figure 6:
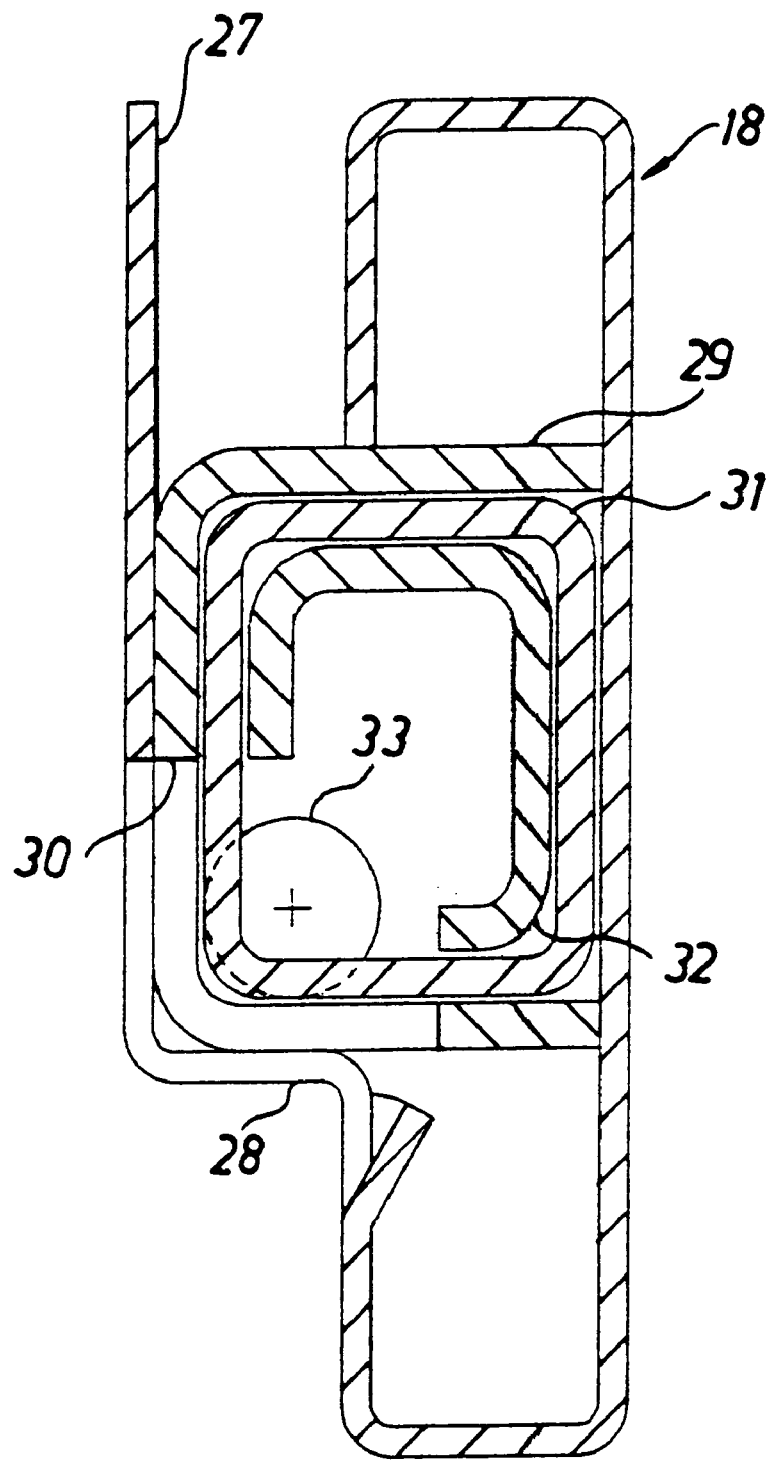
Figure 7:
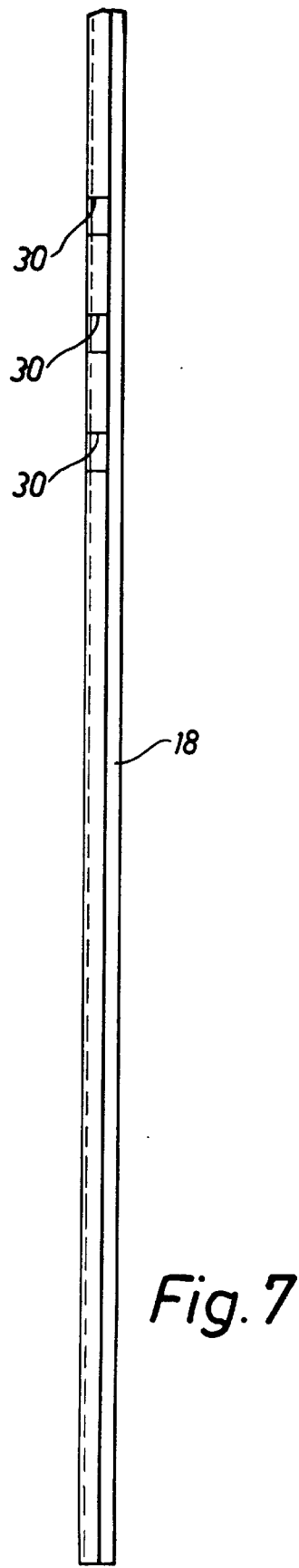
Figure 8:
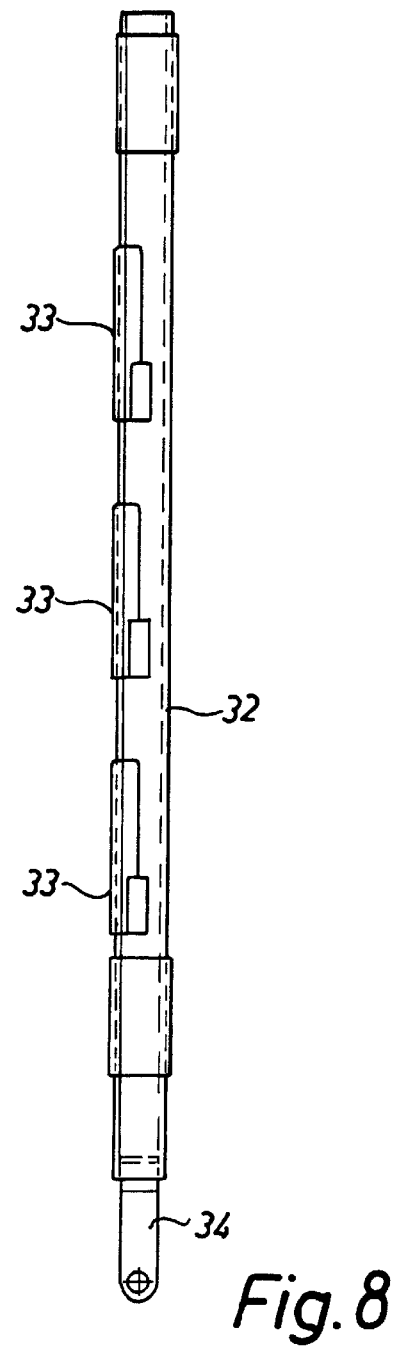
Figure 9:
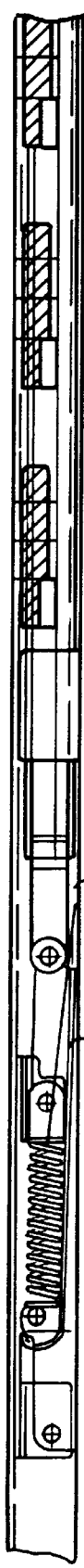
Figure 10:
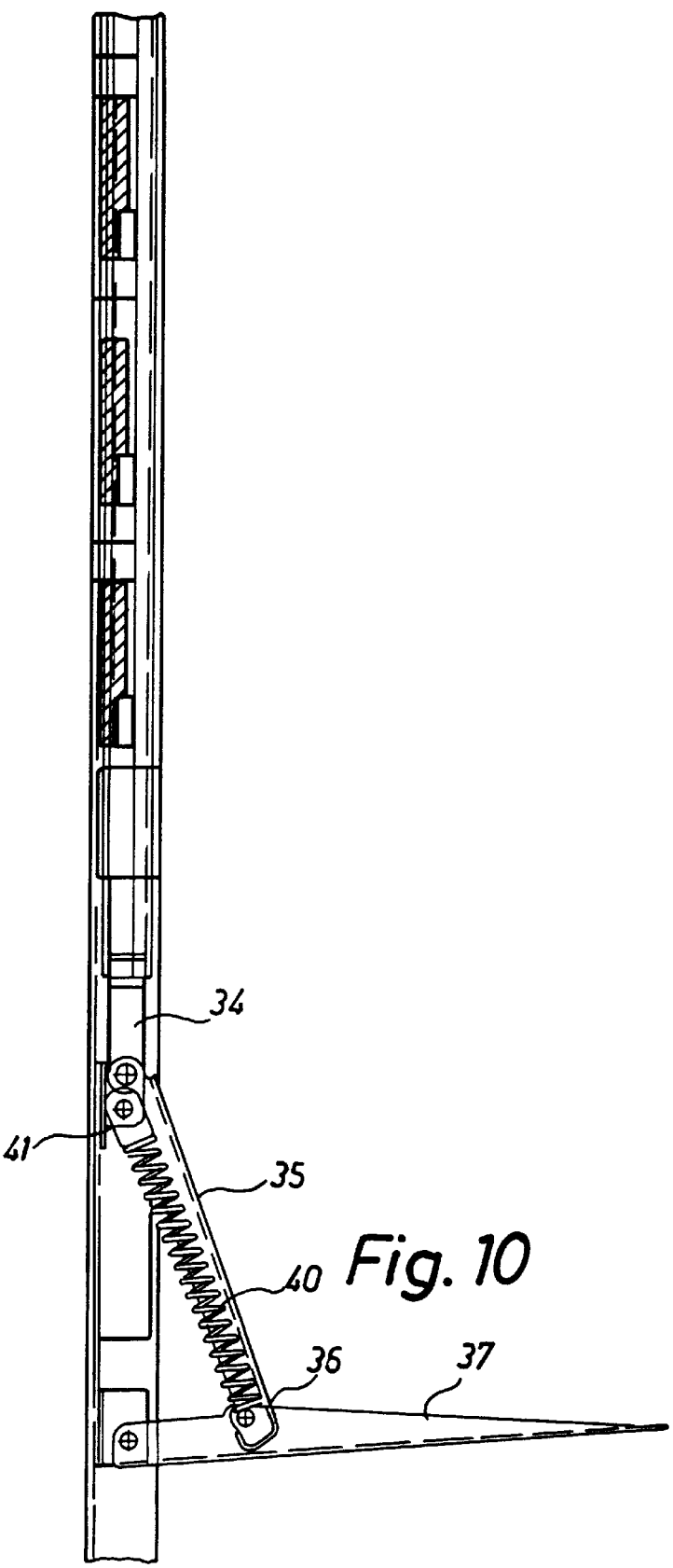

A preferred embodiment of a vehicle for transporting horses according to the invention will now be described in more detail with reference to the accompanying schematic drawings, in which:

FIG. 1 is a side view of a vehicle for transporting horses;
FIG. 2 is a rear view of the vehicle;
FIG. 3 is a top plan view of the steel framework of the vehicle;
FIGS. 4–6 illustrate on a larger scale sectional elements included in the framework in FIG. 3;
FIG. 7 is a side view of the sectional element in FIG. 6;
FIG. 8 is a side view of a piston means; and
FIGS. 9 and 10 illustrate part of a sectional element and means included therein, partly in cross-section and in two different positions of use.

FIG. 1 shows a vehicle 1 for transporting horses, which comprises a wheel-mounted chassis 2 and, arranged thereon, a superstructure 3. The chassis 2 is designed in a conventional manner and need not be further described since it is of no import for the understanding of the invention.

The superstructure 3 comprises side walls 4, a roof 5, a front door 6 on both sides of the vehicle and a rear door 7. The rear door 7 and one of the two side doors 6 can be lowered to form a ramp, on which a horse can be moved from behind into the vehicle and then be moved forwards to leave the vehicle.

FIG. 2 is a part-sectional rear view of the vehicle 1, the rear door 7 shown in FIG. 1 and some other components in FIG. 1 being deleted for better clarity, The interior of the vehicle 1 is divided, by means of a partition 8 extending in the direction of travel of the vehicle, into two parallel compartments. The compartments are laterally defined by the side walls 4 of the vehicle and by the partition 8, while in the direction of travel they are defined by bars 9 at the front and at the back.

FIG. 2 illustrates the rear bars only, since the front bars are identical with these and would merely contribute to making the drawing complicated. Each bar 9 has at one end a stationary sleeve 10 and, at its other end, a movable sleeve 11, which is pivoted to the bar by means of a hinge 12. Thanks to the hinge 12, the bar can, as is evident from FIG. 2, occupy two alternative positions, viz. a position shown to the right, in which the bar 9 is fixedly horizontally arranged transversely of the direction of travel of the vehicle, and a position shown to the left, in which the bar 9 is hanging down vertically in a released state.

In the horizontal position of the bar 9 as shown to the right in FIG. 2, the sleeve 10 occupies at the outer and of the bar a position, in which a through opening (not shown) in the sleeve is arranged vertically. In the same manner, through openings (not shown) in the sleeves 11 are, at the inner ends of the bars, vertically directed in both positions of use of the bars 9, as shown in FIG. 2.

Through each sleeve 11 extends a pin 13. The pin 13 is insertable from above into the opening of the sleeve 11 and, as shown, extends through four spaced-apart sleeves 14. The sleeves 14 form, together with the pin 13 and the sleeve 11 of the bar, a hinge, to which the bar is pivotable. Moreover, the spaced-apart sleeves 14 permit vertical adjustment of the bar 9 by arranging its sleeve 11 in spaces on different levels between the sleeves 14. The suspension of the inner sleeves 11 of the bars 9 corresponds to the traditional bar suspension mentioned by way of introduction.

FIG. 3 is a top plan view of the steel framework of the vehicle 1, four sectional elements which are vertically arranged in the corners of the vehicle and which are of particular import to the invention and therefore will be further described below, being designated 15, 16, 17 and 18 to elucidate the positioning thereof.

FIG. 4 illustrates the sectional element 15 in more detail in the form of a cross-sectional view. The sectional element 15 is formed with grooves 19 and 20 which are intended for the mounting of wall panels (not shown), which constitute the side walls 4 of the vehicle and which, thank to the grooves 19, 20, are readily insertable from above. In addition to the grooves, the sectional element 15 also comprises a central square tube portion 21, in which three recesses 22 are formed in a corner of the tube casing facing the inside of the vehicle, in a manner that will be further described with reference to FIGS. 6 and 7.

FIG. 5 illustrates the sectional element 16 in more detail in the form of a cross-sectional view. The sectional element has a groove 23, which like the grooves mentioned above is intended to receive a wall panel, and has an angular portion 24, which forms part of a door frame for the right-hand side door 6 (shown in FIG. 1) of the vehicle. Like the sectional element 15, the sectional 16 has a central square tube portion 24, in which three recesses 26 are formed analogously. For explaining the relative position and function of the recesses 26, reference is made to the following description of FIGS. 6 and 7.

FIGS. 6 and 7 illustrate the sectional element 18 in more detail in the form of a cross-sectional view, the detailed description of this sectional element also applying to the inverted, but otherwise identical sectional element 17. Analogous to the sectional element 16, the sectional element 18 also has a groove 27 for receiving a wall panel, an angular portion 28, which forms part of a door frame (here for the rear door 7 of the vehicle), and a central square tube portion 29, in whose one corner three recesses 30 are formed one above the other.

The positioning of the recesses 30 in the sectional element and the corresponding positioning of the recesses in the other sectional elements are shown in FIG. 7, which is a side view and illustrates the lower part of the sectional element 18 as seen from the rear end wall when mounted in the vehicle. As will be seen, the three recesses 30 are arranged spaced-apart from each other, more specifically on three different levels, which are selected to fit the height of horses of different size. The level of the recesses 30 corresponds to the level of the above-mentioned spaces between the sleeves 14, such that the bar 19 can be arranged horizontally.

FIG. 6 illustrates, in addition to the sectional element 18, components of a locking device, which is adapted to fasten a bar in one of the three recesses 30. The locking device comprises two sleeve-shaped plastic bushes 31 which are square in cross-section and inserted in the central square tube portion 29 of the sectional element 18 and which, in this portion, movably hold a piston rod 32 and, arranged thereon, three locking bars 33. The contents of the square tube portions of the remaining sectional elements 15, 16, 17 correspond entirely to the contents of the square tube portion 29, which will be further described below with reference to FIGS. 8, 9 and 10.

FIG. 8, which is a side view, illustrates a piston rod 32 and its locking bars 33 as well as the two plastic bushes 31. Moreover, a U-shaped bracket 34 is shown, which is attached to the lower end of the piston rod. As is evident, the three locking bars 33 are arranged in alignment with and at a certain distance from each other. More specifically, their positioning corresponds exactly to the positioning of the three recesses in the square tube portion of each sectional element. They will thus, by displacement of the piston rod 32, be insertable simultaneously into the respective recesses so as to engage, in the recess, in the opening of a sleeve 10 of a bar 9, which thus is fastened.

FIGS. 9 and 10 illustrate how the displacement of the piston rod 32 is effected. The two figures show part of the sectional element 18 and the locking device arranged therein in longitudinal section. As appears from the figures, the U-shaped bracket 34 of the piston rod is hingedly connected to one end of a link arm 35, whose other end, at 36, hingedly engages with a central portion of a lever 37. The lever 37 is mounted in the square tube portion of the sectional element in an elongate opening 38, which is formed in the longitudinal side of the sectional element facing the outside of the vehicle. The elongate opening 38 and, thus, the positioning of the lever 37 on the outside of the sectional element 18 are clearly seen in FIG. 1, where also the corresponding lever 39 of the sectional element 16 is shown.

The lever 37 is, by means of a compression spring 40 extending between the attachment of the link arm 35 to the lever 37 and a mounting 41 inside the square tube portion, biased to the position in which it is retracted in the sectional element (FIG. 9) and in which the locking bars 33 of the piston rod extend into the recesses 30 for engaging with a bar. Also in its swung-out position (FIG. 10) the lever, however, occupies a stationary resting position, in which the piston rod 32 is pulled down a distance and in which its locking bars 33 are completely pulled out from the recesses 30 so as to release a bar 9, if any.

As appears especially from the left-hand portion of FIG. 2, there are no projecting bar locking components whatsoever on the inside of the vehicle side wall. Thus, there is a minimum risk of injuries caused by tearing and squeezing. Furthermore, it is evident that the lever 37, which is operable from the outside of the vehicle, permits the safe release of a bar 9, even if a panic-stricken horse should be hanging over it. Finally, it is obvious from the same figure that also injuries caused by tearing are avoided in a reliable manner also at the partition 8, since a released, hanging bar 9, thanks to its relatively great dimensions and its round shape, protects the horse from harmful contact with the projecting bar suspension at the partition.

As is evident from the description above, a vehicle for transporting horses is provided according to the invention, which is both safer and more user-friendly than previous solutions and whose bar attachments can besides be dimensioned to be much stronger than usual, without assuming inconvenient dimensions.

I claim:

1. A vehicle for transporting horses, comprising at least one compartment, which is intended for a horse to be transported standing in the direction of travel of the vehicle, the compartment having, at least in the front part as seen in the direction of travel, a releasable transverse bar, wherein at least one end of the bar is provided with a lug, the end extending up to a front vehicle wall, and the vehicle wall has at least one recess into which the lug of the bar is insertable and lockable by a vertically displaceable piston arrangement having at least one locking bar vertically insertable into the lug, the piston arrangement being connected by a link to a lever arranged on an outside of the vehicle wall such that the piston arrangement is vertically displaceable by the lever.

2. The vehicle for transporting horses as claimed in claim 1, wherein the vehicle wall comprises a plurality of superposed recesses for permitting vertical adjustment of the bar, and that the piston arrangement has a plurality of locking bars corresponding to the recesses.

3. The vehicle for transporting horses as claimed in claim 1, wherein the at least one recess in the vehicle wall is formed in a sectional element integrated with the vehicle wall.

4. The vehicle for transporting horses as claimed in claim 3, wherein the sectional element simultaneously forms a jamb of a vehicle door.

5. The vehicle for transporting horses as claimed in claim 4, wherein the jamb is a single chamfer jamb of an outwardly opening vehicle door, and the at least one recess is formed in an inner angular portion of the jamb.

6. The vehicle for transporting horses as claimed in claim 2, wherein the at least one recess in the vehicle wall is formed in a sectional element integrated with the vehicle wall.

7. The vehicle for transporting horses as claimed in claim 6, wherein the sectional element simultaneously forms a jamb of a vehicle door.

8. The vehicle for transporting horses as claimed in claim 7, wherein the jamb is a single chamfer jamb of an outwardly opening vehicle door, and the at least one recess is formed in an inner angular portion of the jamb.

* * * * *